H. W. LEONARD, DEC'D.
C. G. LEONARD, ADMINISTRATRIX.
ELECTRIC SYSTEM FOR MOTOR VEHICLES.
APPLICATION FILED MAR. 31, 1914.

1,288,938.

Patented Dec. 24, 1918.

Witnesses:
Joseph D. Connolly
M. L. Rickland

H. Ward Leonard, Inventor
By his Attorneys
Edwards, Sager & Wooster

UNITED STATES PATENT OFFICE.

HARRY WARD LEONARD, OF BRONXVILLE, NEW YORK; CAROLYN G. LEONARD, ADMINISTRATRIX OF SAID HARRY WARD LEONARD, DECEASED, ASSIGNOR TO H. WARD LEONARD INCORPORATED, A CORPORATION OF NEW YORK.

ELECTRIC SYSTEM FOR MOTOR-VEHICLES.

1,288,938.   Specification of Letters Patent.   Patented Dec. 24, 1918.

Application filed March 31, 1914. Serial No. 828,432.

*To all whom it may concern:*

Be it known that I, HARRY WARD LEONARD, a citizen of the United States, residing at Bronxville, in the county of Westchester and State of New York, have invented certain new and useful Improvements in Electric Systems for Motor-Vehicles, of which the following is a full, clear, and exact specification.

My invention relates generally to an improvement in an electrical system applicable particularly to motor cars and it also relates to an improved portable light and battery so related to the electrical system that it is maintained in a highly efficient condition at all times.

One object of my invention is to provide a simple, economical and reliable method and means for maintaining a battery in satisfactory condition for service in operating a portable electrical light; another object is to adapt this battery for supplying an ignition system for an engine of a motor driven vehicle by power derived from operation of the engine and to also adapt the portable battery for supplying current for various other purposes for which such a battery may be utilized. Various other objects and advantages of my invention will be understood from the following description and accompanying drawings.

By means of my invention a small portable storage battery is adapted to be used in many instances where primary batteries have been used as an auxiliary to the electrical control systems of a motor car, and it is also adapted to be used in the place of a portable primary battery which has customarily been used in conjunction with a small electric lamp formed within a casing also containing the primary battery. Such a portable lamp and primary battery are usually provided with a switch or button adapted to be closed when it is desired to use the lamp and to be opened when the lamp is not in use. But such portable electric lamps or flash-lights using primary batteries are unreliable and the user cannot feel sure how much longer they will run at any given time and is helpless without new primary batteries when the old ones run down. They are also expensive to maintain if used to much extent. They depreciate in the energy available even when not used, and their internal resistance is so high that they cannot be used for purposes to which my improved portable storage battery is adapted.

Figure 1:
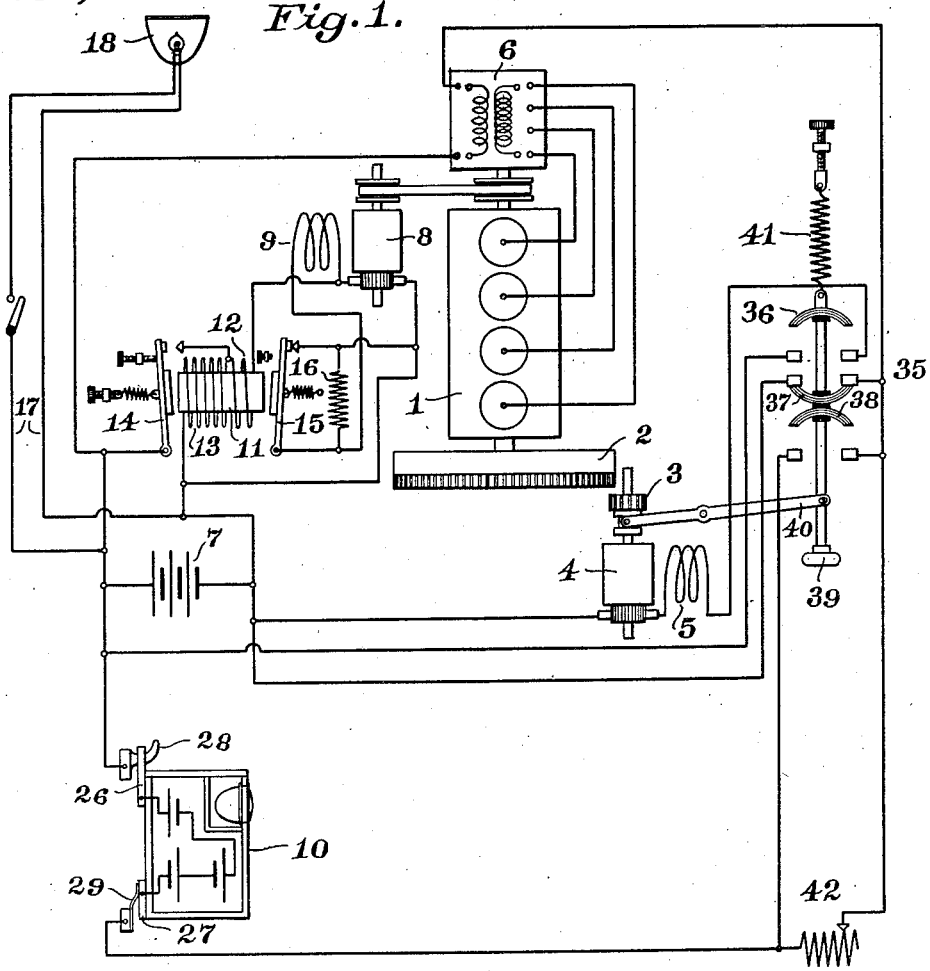
Figures 2, 3:
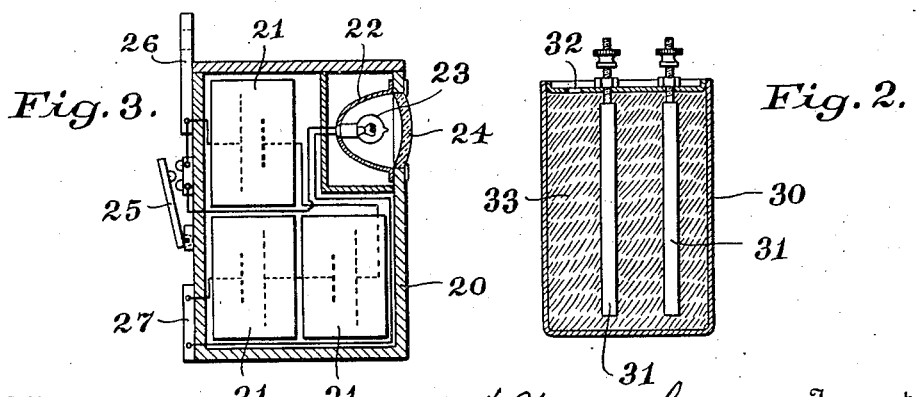

In the accompanying drawings, Figure 1 is a diagram showing one embodiment of my invention in an electrical system for a motor car; Fig. 2 is a sectional view of a portable storage battery cell; and Fig. 3 is a sectional view of one form of portable unit having three storage battery cells and an electric lamp.

Referring to Fig. 1 a gasolene engine is indicated at 1 which is used for propelling the car and is shown as driving a fly-wheel 2, the periphery of which is toothed and adapted to be engaged for starting purposes by the slidable gear 3 on the shaft of an electric starting motor 4. This starting motor is shown as a direct current motor having the usual series winding 5. The gasolene engine is indicated as a four cylinder engine, the spark plugs being supplied by wires from the distributer 6 with which is incorporated the usual induction coil the primary of which is shown receiving energy for ignition purposes from a main storage battery 7 of the usual character, the secondary supplying current through the distributer to the spark plugs. This battery is also adapted to supply current to the starting motor 4 for starting the engine. The engine is shown as driving a direct current generator 8 having a shunt winding 9, the generator being adapted for charging the storage battery 7 and the auxiliary portable storage battery 10, and of course also supplies any other devices which it will be desirable to connect to the generator 8.

In order to insure proper charging of the batteries, I provide automatic means for control of the generator and of the circuits. This consists of a compound wound magnet having an iron core 11, a series winding 12 and a shunt winding 13. The magnet is shown as having double armatures, one of which 14 is adapted to be attracted against pressure of a spring or gravity for closing a circuit and the other armature 15 is shown at the other end of the magnet adapted to be attracted against pressure of a spring or gravity for opening a circuit. A comparatively high resistance 16 is shown in shunt around the armature 15 and its contacts, so that when the armature is not attracted the resistance 16 is short-circuited, but when the armature 15 is attracted by the magnet and its contacts broken, the resistance 16 is inserted in series with the shunt field winding 9 across the armature terminals of the generator 8. The potential winding 13 of the magnet is connected in series with the series coil 12 across the armature terminals of the generator 8. When the armature 14 is attracted, the circuit from the armature of the generator 8 is connected through the series coil 12 and contacts of the armature 14 across the terminals of the storage battery 7.

A circuit 17 is shown extending from the battery 7 and this circuit is adapted to supply any of the usual devices supplied from such a battery, such as head-lights, horns, heating devices, etc., a head-light 18 being indicated in the drawings.

The portable battery and portable lamp 10 of Fig. 1 is more fully shown in Fig. 3 and is shown as having a general casing 20 inclosing three storage battery cells 21, two of which are located side by side in the lower part of the casing 20, and the third being located in the upper part of the inclosing casing, the remaining space being occupied by a reflector 22, within which is located an incandescent lamp 23, the opening through the casing being closed by a glass 24. A switch 25 of any suitable form is shown located on the outside of the casing, the closure of which connects the lamp 23 in circuit between the terminal plates 26 and 27 on the outside of the casing. The terminal plate 26 is perforated at its upper end to receive the hook 28, which hook is in electrical connection with one side of the battery 7 as shown in Fig. 1. The hook 28 supports the portable unit and when the unit is in position below the hook, the lower plate terminal 27 is in engagement with a yieldable contact 29, which is electrically connected to parts shown in Fig. 1, to be more fully described. When the portable unit is hung in position upon the hook the electromotive forces of the two batteries are in opposition to each other, the connections being such as to receive charging current from the main storage battery 7 or from the generator 8 when the latter is in service. The three cells 21, are connected in series with each other between the plate terminals 26 and 27 of the portable unit as diagrammatically indicated in Fig. 3.

I prefer to use a form of storage battery cell as shown in Fig. 2 of the drawings which is made up of a retaining case 30 of suitable material such as celluloid which is not likely to crack or otherwise be affected by the acid electrolyte. The two plates of the battery are shown at 31, which may be of the usual type of the same character as those of the main battery 7, and are connected to terminals at the upper part. The upper portion of the cell is preferably entirely sealed, except for a small ventilating perforation 32. For the purpose of separating and positioning the plates and for also retaining the electrolyte, I preferably fill the cell with finely spun glass 33, which is between the two plates 31 as well as between the plates and the casing. When the cell is filled with the electrolyte through the opening 32, it is entrained all through the spun glass and retained somewhat similar to the retention of a liquid by absorbent cotton and hence does not tend to leak out of the cell no matter in what position the cell may be placed. I have found this form of cell to be very satisfactory in efficiency and life, and it may be made in small sizes with very satisfactory results.

A manually operated switch is shown at 35, which carries three bridging elements 36, 37 and 38 adapted to make and break circuit between three sets of fixed contacts as shown. The switch is shown as having the handle 39 adapted to be pulled by the operator against the tension of the spring 40 and when so pulled the bridging element 37 breaks connection with its contacts, and the elements 36 and 38 are brought into engagement with their fixed contacts. At the same time the handle 39 is pulled by the operator, the slidable gear 3 is thrown by the pivoted lever 40 into engagement with the gear on the fly-wheel 2 for starting the engine. When the operator releases the handle 39 the spring 41 pulls the switch back to the position shown in the drawings and also throws the gear 3 to its disengaged position as shown in the drawings.

An adjustable ohmic resistance 42 is shown connected in relation to the portable unit 10 and other parts, the function of which will be more fully explained hereinafter.

With reference to the operation of the automatic means for controlling the generator 8 and its charging circuit connections, this may be briefly described as follows: Assuming the parts to be in the position shown in Fig. 1, it is of course, desirable that the generator 8 shall not be connected in circuit with the battery 7 until its voltage has risen to the proper amount. When the engine and generator 8 are started and the speed increased, the voltage of the generator rises and at a predetermined voltage, sufficient current will be passed through series coil 12, and potential coil 13 of the controlling magnet, these windings being cumulative in their effect under normal conditions, to attract the armature 14 and close the charging circuit between the generator 8 and the battery 9, this circuit extending from the battery 8 through the series coil 12, the armature 14 to one terminal of the battery 7 and then from its opposite terminal back to the generator 8. Upon the passage of the charging current through the series coil 12, the attractive force of the controlling magnet is somewhat increased depending upon the relative voltages between the generator and that of the battery 7. If the charging current becomes undesirably large, the controlling magnet will be so strongly energized as to attract the armature 15, which action breaks the circuit between the contacts controlled by the armature 15, which results in inserting the resistance 16 in the circuit of the shunt field winding 9 of the generator. The resultant weakening of the field strength by this action lowers the voltage of the generator, which reduces the excessive charging current, and as the strength of the controlling magnet is also reduced, the armature 15 is released and the field strength of the generator strengthened by the short-circuiting of the resistance 16. This causes the voltage of the generator and the charging current to again increase and if it again becomes excessive, the above described action is repeated. If the voltage of the generator from any cause falls below that of the battery or becomes so much reduced as to make the connection between the generator and the battery undesirable, the potential coil 13 owing to its reduced current will permit the armature 14 to be pulled by its spring to open circuit position, and will remain in the open position until the voltage of the generator has increased to a predetermined amount. It will also be understood that in case the circuit between the generator and the battery 7 is in closed position and if the voltage of the generator should be lower than that of the battery while the charging circuit was closed, a reversed current would flow through the series coil 12 which would then act in opposition to the potential coil 13, and reduce the resultant magnetization of the controlling magnet to such an extent as to cause the armature 14 to be quickly released by the magnet and thereby open the charging circuit until normal charging conditions were restored.

The manual switch at the right of Fig. 1 is shown in position for normal running and by tracing the circuits it will be seen that the ignition energy is supplied by the battery 7, a circuit extending from one pole of the battery through bridging element 37 of the manual switch, thence through the ignition means 6 and then back to the other pole of the battery 7. It will also be seen that the portable battery unit 10 is at this time connected in parallel with the battery 7 through resistance 42 and the bridging element 37 of the manual switch.

If the engine is at rest, and it is desired to start the engine, the operator pulls the handle 39 forward. This throws the gear 3 of the starting motor into mesh with the gear on the fly-wheel 2 and at the same time the bridging element 37 is moved from its contacts, whereas the bridging elements 36 and 38 of the switch are closed against the corresponding contacts. The opening of the element 37 opens the circuit between the main battery 7 and ignition means, and also opens the circuit between the battery 7 and the resistance 42 and portable unit 10. The closing of the element 36 places the starting motor in closed circuit with the battery 7 and the closure of the element 38 places the portable battery 10 in closed circuit with the ignition means, the resistance 42 being out of circuit or short-circuited in this position of the switch. It will therefore be seen that in starting, the motor draws energy only from the main battery 7 and that during this period, the ignition means are independently supplied with energy from the portable battery 10, resistance 42 being without effect. As soon as the engine is started, the operator releases the handle 39 and the switch is then moved by the spring 41 to the normal running position already described.

In some cases I secure the substantial independence of the two batteries while the large one is cranking the engine and the small one supplying the ignition, by making the resistance 42 of sufficiently high ohms so that the current, which tends to flow from the small battery to the large one, during the cranking of the engine, is so small as not to operatively interfere with a proper supply of energy from the small battery to the ignition coil. In such case I can dispense with the switch element 38 for short circuiting resistance 42, and also with switch element 37 which opens the local circuit containing the two batteries 7 and 10 and the resistance 42.

In further explanation of the operation, let us assume that the battery 7 is a 6 volt battery and that it is rated at say 100 ampere hours when discharging at a rate of about 100 amperes per hour. The internal resistance of such a storage battery is very low and hence it is possible to momentarily take from it a very large current for starting the engine. The maximum current taken in this way often reaches 500 amperes in practice, although 120 amperes is fairly representative of the current needed to crank an average gasolene engine at 120 revolutions per minute. While such a battery will have about 6 volts across its terminals when in good condition and when supplying a small current, the effect of the internal resistance and other characteristic features of the battery causes the voltage across the battery to rise to say 7 volts, while being charged from the generator, and causes the voltage across the battery terminals to fall as low as 4 volts when starting conditions are unfavorable and the starting current is excessively high.

The battery supplying the ignition circuit should remain at sufficiently high voltage to secure proper ignition, even when the starting battery voltage is low, due to the current drawn while starting the engine.

With reference to the resistance 42, suppose for example, that it amounts to 1.5 ohmic resistance. As above explained when the portable unit is hung in place on its hook and normal running conditions are established, the small battery is connected through the 1.5 ohms to the large battery 7, these batteries being in parallel with each other relatively to the charging generator. The internal resistance of each of the three small cells of the portable unit may be fairly assumed to be ⅓ ohm, making a total internal resistance of 1 ohm for the small battery. Suppose the large battery to be well charged and the charging current from the generator is being passed through it, the voltage across its terminals at such a time being about 7 volts. Suppose the portable to have been used considerably and its voltage to be 5.5 volts. It may be assumed that the total resistance in the circuit including the two batteries and the resistance 42 is 2.5 ohms. Then there will be 1.5 volts effective in sending current through 2.5 ohms and the charging current to the portable will be .6 of an ampere. As the charging of the portable battery under these conditions causes its voltage to gradually rise, the current flowing through the portable will automatically taper down. When the voltage of the battery 7 is seven volts and the counter volts of the portable are 6, there will be one volt effective through 2.5 ohms resistance and about .4 of an ampere charging the portable. When the counter volts of the portable attain 6.5 volts, the charging current will be .2 ampere. Gradually in this way as the charging automatically continues, the charging current automatically tends to be reduced and theoretically will finally reach zero current. This automatic tapering down of the charging current from say .6 ampere to zero is important as this results in the minimum loss of water from the portable due to electrolysis and consequently the portable will require the minimum amount of attention in this regard. Another function of the resistance 42 is to prevent excessive flow of current from the large battery in case an accidental short-circuit be made across the stationary contacts upon which the portable is supported and connected, as well as limiting the maximum charging current to an amount which will not be harmful to the portable battery. The amount of this resistance will be determined by the characteristics of the portable battery, the voltages of the large and small battery and other controlling conditions. The resistance 42 is therefore preferably adjustable and is so indicated in the drawings.

In case the car is not in operation or in use so that no charging current is being supplied to the large battery 7 and it has been charged to about six volts, then if the portable unit has been used for other purposes until its voltage has been reduced to 5.5 volts, then when hung up upon its hook there will be .5 volt effective for charging the portable battery through 2.5 ohms and the charging current at that time will be .2 ampere. In the course of a few hours the portable battery will be charged until its voltage is nearly equal to that of the large fully charged battery.

In some instances it may be desirable to have the portable unit as small and light in weight as possible and it may be unimportant that it should be used for independently supplying the ignition means of the engine. In such cases, I use a portable unit of one battery cell of two volts and connect it across one cell only of the large battery using about .5 ohm in the circuit between them. I have found the portable storage battery unit very satisfactory and desirable in practice. Even if it be completely exhausted, it can be restored to perfect condition in a few hours, by merely hanging it in place on its hook. Even if the portable be accidentally reversed in connections to the large battery so that the large battery tends to short-circuit through the portable and sends current through the portable in the reversed direction from that needed for charging it, although the relationship of the terminals are of such form as to prevent incorrect connections, I have found that the only apparent result was that in a comparatively short time the portable became re-charged in the opposite sense; that is, the positive plate was converted into a negative plate and vice versa, but the portable was satisfactorily operative under these conditions. The portable unit above described has many uses and advantages. If difficulty is experienced in starting the engine, when the portable is used for supplying the ignition means independently, it is possible to quickly ascertain if the voltage of this ignition battery is perfect, by merely turning on the incandescent lamp which is a good indicator of the condition of the battery, and which may be readily understood by any user. When touring the portable is useful to examine machinery, consult maps, examine baggage, read signs on the roadway or to make excursions on foot.

The portable unit when not in use is always hung in place and charged as already explained, and being normally kept in a definite well known position on the car, which may be at any desired location on the car, is instantaneously available in case a light becomes important in a hurry for any purpose. It is perfectly safe as regards risks of explosion of gasolene and therefore is convenient when filling the gasolene tank or in the presence of any explosive. Such a portable unit is convenient to take with one when stopping at night at strange places, or to have with one at night, in case of fire, panic, burglary, sickness, or any other occasion where a reliable instantaneous light may be of service. It may be made of any desirable form and may be of service to doctors using motor cars as it enables them to have a suitable battery for lights, cauteries, induction coils, and other applications of medical and surgical devices.

It may sometimes be advisable to have several such portable units which could be kept charged in perfect condition on a motor car, motor boat or any charging plant, and such units could be used without fear that they might become exhausted and useless.

It will be understood that various modifications of my invention may be made without departing from the scope thereof.

Having thus described my invention, what I declare as new and desire to secure by Letters Patent of the United States is:—

1. In a motor car, a gasolene engine, a lighting and engine starting system, electric ignition means for the engine, a portable unit comprising a storage battery and lamp adapted when placed in position on the car to be connected in circuit with the lighting system for charging said portable unit, and controlling means for causing said unit to independently supply the ignition means while the engine is being automatically started.

2. In a motor car, a gasolene engine, two storage batteries, means for charging said batteries in parallel with each other with energy derived from said engine, and means for causing one of said batteries to supply energy for cranking the engine and for causing the other of said batteries to supply the ignition means of the engine.

3. In a self-propelled vehicle, a gasolene engine for producing energy for propelling the car, a storage battery for supplying current for head-lights and for cranking the engine, a second storage battery for furnishing current to the ignition means of the engine while the first-named battery is supplying current for cranking the engine, and means for charging the two batteries in parallel after the engine has been started.

4. An internal combustion engine, electric ignition means therefor, a storage battery normally supplying energy to said ignition means, dynamo electric means for transforming part of the power of the engine into electric energy and for supplying energy to charge the storage battery and for later utilizing such stored energy to crank the engine, a second storage battery, and circuit connections for connecting the second storage battery to supply the ignition means while the first battery is supplying energy for cranking the engine and for connecting the second storage battery in parallel with the first battery after the engine has been started whereby the two batteries are charged by energy derived from the engine.

5. A gasolene engine, jump spark ignition plugs therefor, an induction coil having a primary and a secondary winding, the secondary being connected to said spark plugs, a storage battery connected to said primary winding, a second storage battery, a dynamo driven by the engine for charging the second battery, an electric motor operated from said second battery for cranking the engine, and controlling means for disconnecting the first battery from said primary coil and for connecting said first battery in parallel with said second battery after the engine has been started.

6. In a motor car, a gasolene engine, two storage batteries, means for charging said batteries in parallel with each other with energy derived from said engine, and means for causing one of said batteries to supply energy for cranking the engine and for causing the other of said batteries to independently supply the ignition means of the engine.

7. A gasolene engine, a storage battery, means for cranking the engine by energy derived from said battery, a second storage battery, ignition means for the engine supplied with energy derived from said second storage battery, said second storage battery and ignition means being in a circuit independent of said first named battery, a dynamo driven by said engine, and means whereby said batteries are charged by said dynamo.

8. In a motor driven vehicle, a gasolene engine adapted to produce propelling power, a dynamo driven by said engine, incandescent head-lights, electric ignition means for the engine, two storage batteries, one adapted to supply the ignition means and the other to independently supply the head-lights, and controlling means for causing said dynamo to charge both of said batteries by energy derived from the power of said engine.

9. A gasolene engine having electric ignition means, a storage battery for supplying energy to the said ignition means, an electric motor for starting the engine, a second storage battery for supplying said electric motor independently of said first named battery and of said ignition means, and means for maintaining both of said storage batteries charged by energy derived from said engine.

10. A motor car, a gasolene engine for producing the propelling power, incandescent head-lights, a storage battery for supplying said head-lights, electric ignition means for the engine, a second storage battery for supplying said ignition means independently of said first named battery and of said head-lights, and dynamo electric means for converting a part of the power produced by said engine into electric energy and for charging both of said batteries independently of any outside source of energy.

11. A gasolene engine, a plurality of storage batteries, a single dynamo driven by said engine for simultaneously charging said batteries, means for starting the engine, said means deriving its energy from one of said batteries, and means for causing another of said batteries to independently supply the ignition means for the engine while the engine is being started.

12. A gasolene engine, a plurality of storage batteries, a single dynamo driven by said engine for simultaneously charging said batteries, means for starting the engine, said means deriving its energy from one of said batteries, and means for causing another of said batteries to independently supply the ignition means for the engine while the engine is being started.

13. A gasolene engine, means for starting said engine comprising two storage batteries, one for supplying energy for cranking the engine and the other for independently supplying energy for ignition, and means for charging both of said batteries by energy derived from the engine after it has been started.

14. In a motor car, an engine for supplying the propelling energy, a main storage battery for supplying the lights and the ignition means while the car is in motion and for supplying energy for starting the engine, an auxiliary storage battery, said auxiliary battery having an indicating device for indicating its condition, means for simultaneously charging said main battery and said auxiliary battery by energy derived from the engine, and controlling means for causing the auxiliary battery to independently supply the ignition means while the engine is being started by energy supplied from the main battery.

In testimony whereof I affix my signature in presence of two witnesses.

HARRY WARD LEONARD.

Witnesses:
   Geo. J. Schek, Jr.,
   B. E. Smythe.